J. ILLY.
COMBINATION PRESSURE GENERATOR, MIXER, AND ENGINE.
APPLICATION FILED NOV. 11, 1907.
933,907.
Patented Sept. 14, 1909.
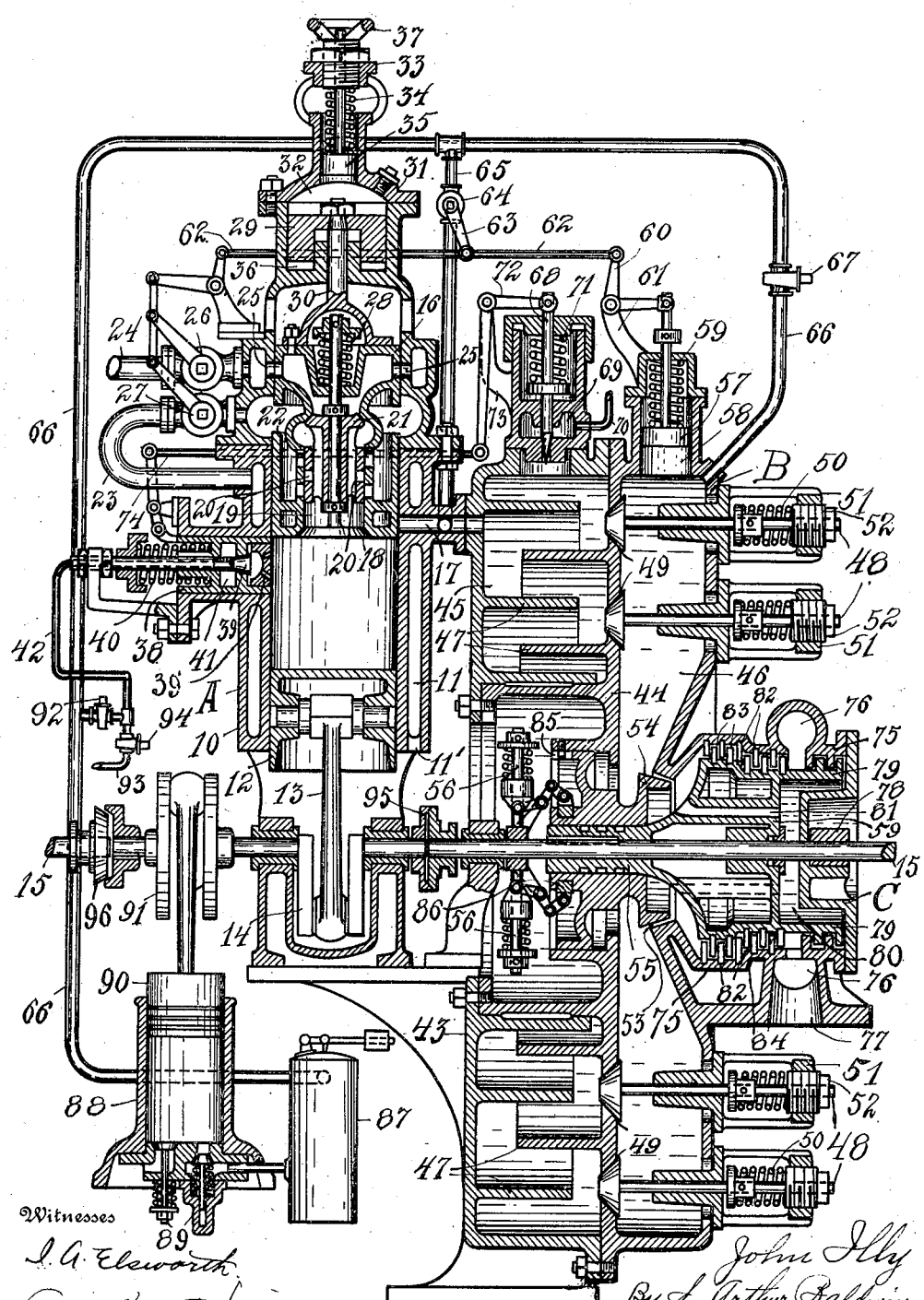

UNITED STATES PATENT OFFICE.

JOHN ILLY, OF JAMESTOWN, NEW YORK.

COMBINATION PRESSURE-GENERATOR, MIXER, AND ENGINE.

933,907.

Specification of Letters Patent. Patented Sept. 14, 1909.

Application filed November 11, 1907. Serial No. 401,552.

*To all whom it may concern:*

Be it known that I, JOHN ILLY, a citizen of the Republic of Switzerland, and resident of the city of Jamestown, in the county of Chautauqua and State of New York, have invented a new and useful Combination Pressure-Generator, Mixer, and Engine, of which the following, taken in connection with the accompanying drawings, is a full, clear, and exact description.

The invention relates to improvements in the combination of a heat or pressure generator, mixer and an engine in connection therewith, and contains the claims for the entire combination, the heat generator being covered in my application for Letters Patent, Serial Number 372,869, filed May 10th, 1907, and the mixer application bears the same date as this application, Serial Number 401,551.

The object of the invention is to produce, preserve, and use direct the heat units of the fuel, either liquid or gaseous, to expand a medium, such as air, gas or water, to drive a turbine engine by the expansive force of said medium; and toward this end to provide, first, an automatically adjustable compression chamber and means for feeding either liquid or gaseous fuel to said chamber to be exploded therein by compression; second, to provide means for controlling the temperature of the heat in the explosion chamber by the injection of air or water; third, to provide a mixer or receiver for the products of combustion and other fluids and to equalize and control said fluids therein by the injection of air or water as a cooling medium; fourth, to provide a gas turbine so constructed that it is driven and automatically balanced by the pressure of the heated mixture of gas, air and steam; and fifth, to provide suitable means for the connection and coöperation of all of these parts in a single engine.

The drawings show a vertical sectional view of an entire engine plant combining the heat generator, mixer, turbine and air compressor, all arranged as a coöperating whole and for the use of a fluid fuel.

My entire machine is a coöperating whole, each part interacting with the other parts as clearly hereinafter described; but for convenience in describing the mechanism, the machine is divided into three parts, as follows:

The letter A indicates the compressor, heat generator, or pressure generator.

The letter B indicates the mixer, receiver, heating or vaporizing chamber.

The letter C indicates the turbine.

In the heat generator A the numeral 10 indicates a double walled cylinder, which double walls provide a space 11 for air or water-cooling said cylinder. Either air or water may be used in space 11. Cylinder 10 is arranged for air cooling with admittance for the air through opening 11'. Air is preferred for this purpose as the heat absorbed in the cooling process is more easily saved by the use of the air from space 11 to assist in the combustion, in a manner hereinafter set forth.

The numeral 12 indicates a piston working within cylinder 10 and having a piston rod 13 and crank 14 to connect it with the main drive shaft 15 from turbine C in order to drive said piston. Piston 12 works in one end of cylinder 10 and a valve piston 16 of the same diameter as piston 12 is slidably mounted in the opposite end from the working piston 12. Piston 16 acts as a valve for closing port 17 to the mixer B in the side of cylinder 10, and also contains admission valve 18 for the fuel and air, which valve is opened automatically by the suction of the downward or outward stroke of piston 12.

Above valve 18 is a mixing chamber 19 for the air and gas, to which chamber 19 the air is admitted through valve 20. The gas fuel is admitted to chamber 19 through valve 21. Piston 16 is double cylindrical, that is, a cylinder within a cylinder and the outer cylinder is divided at 22 to admit the air to the outer space between the two walls of the cylinders through valve 20 and pipe 23. The gas is admitted to the inner portion of piston 16 through pipe 24 and valve ports 25, suitable valves being provided in the pipes, 26 for the gas and 27 for the air.

Valves 20 and 21 are made in one piece and a spring 28 is inclosed in the upper portion of piston 16 to close admission valve 18, gas valve 21, and air valve 20. A differential piston 29 is attached to piston 16 by means of rod 30. Piston 29 works in an extension of the casing which extension is closed by cap 31. A chamber 32 above piston 29 is filled with oil under pressure, the pressure being regulated by the screw 33 and spring 34 on piston 35. A chamber 36 is also formed beneath piston 29 which is filled with oil having a higher specific pressure than the oil in chamber 32; the difference in the specific pressure is caused by the difference in area of the two oil bearing surfaces of piston 29. The pressure of the oil in chamber 36 is diminished when the differential piston 29 at the time of the explosion is moved upward by the explosion pressure on the explosion chamber surface of the piston 16. The upward movement of piston 29 causes an increase of volume in chamber 36 and decrease of volume in chamber 32 and consequently a decrease of pressure in chamber 36 and increase of pressure in chamber 32. This increase of pressure on the oil in chamber 32 causes an upward resilient movement of piston 35 as it overcomes the pressure of spring 34 and thereby obtains a continuous increase of pressure. When all the gases in the explosion chamber are expelled and no gas pressure exists against the explosion chamber surface of piston 16, the pressure in chamber 32 actuating in the opposite direction has a tendency to throw back piston 16 and differential piston 29 until a pressure in chamber 36 is produced equal to that in chamber 32. The oil in chamber 36 accordingly, has to nullify this rapid return movement until the pressures in both chambers are equalized. It is therefore obvious that the oil in these two chambers acts as a double cushion. The valve piston 16 and the differential piston 29 are held stationary by this balance of pressure except during the expelling of the product of combustion from the explosion chamber. The pressure in chamber 32, which gives to the valve piston a motionless position, should be as great or greater than the compression pressure which is exerted on the surface of piston valve 16 in the explosion chamber to produce the temperature necessary to reach the self-igniting point of the fuel. The compression pressure necessary to produce the temperature for the self-igniting point differs according to the nature of the different fuels but in consequence of the pressure in chamber 32 this difference in pressure is regulated or taken care of. The pressure required in chamber 32 to hold the valve piston firm until pressure by compression of the combustible charge is reached to produce the temperature for the self-igniting point for each amount of fuel, will be varied or regulated by hand wheel 37.

In order to attain the greatest efficiency it is necessary to have a heat or energy carrier for the heat and gases. It is also necessary to control the temperature of the heat and gases as well as the walls of the explosion chamber itself. Air, or water, or air and water combined, are the elements used for this double purpose and are injected into the explosion chamber in the following manner:

A duplex injection valve is provided consisting of a valve casing 38 which is slidably mounted in an opening in the side of cylinder 10. Casing 38 contains the seat for the valve 39, which valve is supported on a suitable bracket on the cylinder 10. Valve 39 is controlled by means of a spring 40 which presses casing 38 against valve 39 with a pressure greater than the pressure necessary for ignition of the fuel within the explosion chamber in cylinder 10.

Valve 39 and its stem are hollow and a pipe 42 is attached to the outer end of the same. Pipe 42 is connected to a pipe 66 and thereby to a compressed air tank 87, which air tank is charged by means of an air pump 88 having a piston 90 and operating crank 91 in a manner hereinafter set forth. A shut off valve 92 controls the admission of the air to pipe 42 from pipe 66. Pipe 42 has also an extension 93 with a shut off valve 94 therein, which extension 93 is connected to a suitable water tank or to water under pressure so that water under pressure may be injected through pipe 42 and valve 39 through pipe 93. A chamber 41 is provided in casing 38 just in the rear of the valve seat for valve 39 to receive the air, or water, or air and water, under pressure greater than the pressure in the explosion chamber, there being suitable holes from the hollow stem of the valve opening into chamber 41. A plate 39' is provided in the wall of the explosion chamber having minute orifices therethrough, through which the air may be forced, but whose office is more especially to reduce the water to a fine spray as it is forced into the explosion chamber.

Air is greatly preferred as a heat and energy carrier and as a controlling means for the temperature and may be injected from tank 87 through pipes 66 and 42 and valve 39 as above described. At times, however, the heat generator in the explosion chamber is so great that the use of air as a controlling medium is not sufficient. Accordingly water is then injected through pipes 93 and 42 and valve 39. The superheated condition of the gases in the explosion chamber and the cylinder walls is reduced by means of the water, thereby giving control of the temperature of the explosion chamber and greatly prolonging the life of its metallic walls. It is obvious that by such injection of water, steam will at once be generated absorbing a large quantity of the heat and also that steam is an efficient energy carrier. It is also obvious that by setting valves 92 and 94 both air and water may be used but it is desirable to produce as small an amount of steam in the explosion chamber as will be sufficient to obtain the necessary control of the temperature, as the latent heat of the steam signifies a loss.

The air, or water, or air and water, are injected automatically by means of the pressure at the time of the explosion upon the plate 39', which pressure presses outward upon spring controlled casing 38 around valve 39 which is held stationary, thereby allowing a certain amount of the controlling element or elements to be injected into the chamber. It is also obvious that the force of the explosion will control the amount of this pressure and consequently the amount of the controlling element which is injected into the chamber. Thus an automatic control is provided for the temperature within the explosion chamber. It is also obvious that the steam and air will be brought into perfect connection with the heat and hot product of combustion and may then be forced out by means of the explosion pressure end of piston 12.

Instead of water as liquid, it can be furnished as vapor in the explosion chamber through valve 39, and driven out in connection with the heat and gaseous product of combustion by piston 12 through port 17 into the mixer or vaporizer B. Further, instead of air or water as liquid, or water as vapor, neutral gas may be injected into the explosion chamber, or a mixture of water and air, or of water and natural gas, and the amount of any of these fluids injected as an inergy carrier and cooling medium into the cylinder will be regulated by the amount of energy generated by each explosion, as above described, and aid in giving a uniform temperature and pressure in the vaporizer B.

Any part of the injected water in the explosion chamber which may not have time to be converted into steam in the cylinder will be carried out with the gaseous product of combustion and heat and steam through port 17 into the mixer B and will there be converted into steam. Any of these different forms of energy carriers, as above described, may also be injected directly into the mixer B, as hereinafter described, but it is preferred to inject the air and water into the smaller and very much higher heated space of the explosion cylinder, since the heat will be more quickly absorbed and the walls of the explosion cylinder will be kept at a very much lower temperature as above stated.

The part B is variously called a mixer, receiver, heater, or vaporizer according as it is used for various purposes; these consist first of the receiving and mixing of the heated air, gaseous product of combustion and steam from the explosion chamber of the heat generator A; second, the vaporizing of injected water, and third, the heating of non-combustible fluids such as air or inert gas by bringing them into direct contact with the heat from the explosion chamber, and finally the mixing of all these elements to get a uniform mixture of the temperature desired. Accordingly the mixer B is constructed in its interior with a large heating surface by means of projecting and interlapping partitions and preferably with a plurality of chambers with spring valvular connection through which the heated air, gases and vapor force themselves, thereby thoroughly intermixing and at the same time coming under control from their superheated state so as to form a usable motive fluid.

The various chambers of the mixer B are constructed by means of an outer casing 43, which may be made in suitable parts and bolted together, and a dividing partition 44 for a two chamber mixer, thereby forming the chambers 45 and 46. As above stated the heat and gaseous products of combustion from the explosion chamber enter chamber 45. Accordingly it is provided with a large heating surface, preferably by means of interlapping partitions 47. The number of partitions 47 is in accordance with the heating surface desired, and the space required to give the proper mixture of the products of combustion and the injected cooling medium, air or water, the necessary equality of temperature. The interlapping partitions 47 break up the hot products of combustion and mechanically mix them with the cooling medium.

Chambers 45 and 46 are connected by means of valves 48 which extend through chamber 46 to valve seats 49 in the dividing wall or partition 44. Valves 48 are pressed upon seats 49 by means of springs 50 and the pressure of the heated mixture within the chamber 46 with a pressure equal to or higher than the force of the products of combustion in chamber 45 on the valves 48. Springs 50 are placed in suitable yokes 51. The pressure of springs 50 is adjusted by means of nuts 52. Chamber 46 is provided with an outlet 53 to the turbine C. Outlet 53 is controlled by means of the cylindrical valve 54 slidably mounted upon a prolongation 55 of the turbine drum.

The cylindrical valve 54 is controlled by a governor 56 which is mounted on the turbine shaft 15. According to the speed of the turbine shaft 15 the governor 56 by its centrifugal force, will by moving cylindrical valve 54 back and forth increase or decrease the area of opening 53 and according as a greater or less amount of the motive fluid is required by the turbine. The outflow of the mixed motive fluid from chamber 46 reduces the pressure within said chamber and the heated mixture in chamber 45 presses through valves 48 whenever the force of the mixture in chamber 45 is able to overcome the resisting pressure on valves 48. As soon as the pressure rises in chamber 46 by this inflow from chamber 45, valves 48 will be closed. Hence there will be a constant opening and closing of valves 48 and leakage of the mixture through said valves.

In order further to control or equalize the variation of pressure in chamber 46 arising from the flow through the large outlet valve area 53, a piston 57 is provided in a suitable opening 58 in the casing of chamber 46, which piston will be raised in proportion to the increase of pressure in chamber 46, and lowered by a spring 59 in proportion to the decrease of pressure. A bell crank 60 is pivotally supported on a fixed arm 61 on the casing, and has one arm pivotally attached to the upper end of the stem of the piston 57; and its other arm is pivotally attached to a link 62 which is connected to the fuel admitting valve for the heat generator A, so that the oscillation of bell crank 60 due to the variation of pressure in chamber 46 will control the amount of fuel admitted to the heat generator. It is apparent that the desired degree of heat may thus be attained and continuously produced. Link 62 is also pivotally attached to lever 63 which turns valve 64 in air supply pipe 65 and the motion of link 62 will thus control the amount of cooling medium admitted to chamber 45 in proportion to the heat units in the amount of fuel admitted to the heat generator and the consequent force derived therefrom. Air supply pipe 65 is continued by pipe 66 to chamber 46 and has valve 67 so that the air can be supplied as a cooling medium to chamber 46 should the temperature of the mixture become too high. It is desired, however, that the first chamber 45 shall be the main receiving chamber for the gaseous products of combustion and the cooling medium as the highest temperature exits in chamber 45 as it receives the products of combustion direct from the explosion chamber and a rapid decrease of temperature is necessary to avoid injury to the material of which the mixer is composed. The air, as a cooling medium, will be admitted to chamber 46 by turning valve 67 by hand, since this is only needed in emergencies.

Should the combustion chamber not be sufficient to produce the steam for the purpose as stated chamber 45 is provided with means for the injection of water as follows: A needle valve 68 is provided in the casing of chamber 45 and controls the opening between chamber 69 and chamber 45. Chamber 69 is filled with water by means of pipe 70, the water being under pressure greater than that existing in chamber 45. Needle valve 68 is pressed upon its seat by spring 71. The upper end of the stem of the needle valve 68 is attached to one arm of the bell crank 72. Crank 72 is pivotally supported on a fixed arm 73 on the casing. The other arm of crank 72 is pivotally attached to link 74, which link is connected to the injector 38 of the cooling medium in the heat generator A.

As above described, the injector of the cooling medium in the heat generator A is actuated by the explosion pressure in the explosion chamber and this motion is transferred by link 74 and bell crank 72 to needle valve 68. It is apparent that the height of the explosion or pressure in the heat generator will control the size of the opening for the valve 68 by controlling the distance which the needle valve is raised from the valve seat; and in consequence a lesser or greater quantity of the cooling medium, such as water, will pass into chamber 45 where it will be vaporized by the absorption of heat from the gaseous products of combustion. Thus a uniform mixture of the gaseous products of combustion, air and steam from a certain temperature and pressure may be maintained in the mixing chambers.

Instead of air or water as a cooling medium, an inert gas may be injected into the gaseous products of combustion in chamber 45; or a mixture of water and air, or of water and neutral gas, and the amount of any of these fluids injected as an energy carrier or cooling medium will be regulated so as to be in proportion to the over-production of heat produced by each explosion from a certain quantity of fuel and air, which causes an overheating and decreasing of density of the resulting products of combustion from the fuel and air.

The receiver B is continually filled with the mixture of the products of combustion and other fluids under high pressure from the explosion chamber in the generator A. The large circular opening 53 is provided in the side of the receiver B on chamber 46. It is obvious that a mixer with a single chamber could have been arranged and this exit 53 could be arranged from chamber 45 direct into turbine C and not depart from my invention. It is found, however, that where one chamber contains a direct inlet from the heat generator and also the outlet to the turbine the pressure on the mixture within the mixer from the heat generator is apt to be transmitted to the outflowing mixture, and the mixture will cause speed variation in the turbine. It is therefore preferred that at least two chambers be provided as herein shown. The opening 53 is preferably made in the form of a large circular valve which admits the heated mixture to all sides of the turbine C.

The turbine C consists of the shell or casing 75 which has opening 76 extending around the same to the exhaust port 77, also the bearing 78 for shaft 15. The turbine cylinder 79 is keyed to shaft 15 within shell 75 to be turned by said shaft. Cylinder 79 is arranged at its outer end so as to provide the chamber 80, pipes or closed openings 81 extending through cylinder 79 to chamber 80 so that the steam, gaseous product of combustion and heated air pass through pipes 81 into chamber 80 and balance or equalize the weight and pressure of cylinder 79. It is apparent that by adjusting the size of chamber 80 and pipes 81 to the weight of the cylinder, said cylinder may be placed in any position, vertical, horizontal, or at an angle, and the heated gas, steam, and heated air will form an equalizing support for the same. A number of series of stationary blades 82 are placed on the inner surface of stationary shell 75, and a number of alternate series of blades 83 are placed on the outer surface of revoluble cylinder 79. As the mixture of steam, gas and heated air enters the turbine cylinder, it strikes the fixed blades 82 which are so curved as to give the mixture a turn to one side. The blades 83 on the turbine cylinder 79 are cupped in the opposite direction so that the cylinder 79 is given a swift rotative movement by the shape of the blades. A sufficient number of series of stationary and movable blades are provided to exhaust the entire force of the mixture.

The expansion of the mixture of heated steam, gas and heated air in the turbine takes place adiabatically. It is apparent that the mixture on its entrance to the turbine has a certain velocity and that it will retain this velocity while the increase of the steam replaces the contraction of the air and gas. The ideal is to preserve this balance so that the mixture will have a constant velocity. This is hardly possible, however, since the volume of steam as an energy carrier is preferably as small as possible, as above stated; accordingly, it is usually necessary to place one or more decreasing steps 84 in the diameter of the cylinder 75 and 79 as the heated gas and air increase and contract. The number of such steps however, is reduced to the minimum by the adiabatic expansion of heated steam, gas, and air as above described. In order to preserve a constant velocity the decreasing step 84 is necessitated at that point when the increase of the volume of steam by expansion fails to maintain constant velocity by the pressure fall and contraction of the fluid gases.

The heat generator A which is on the driving shaft 15, will be started into motion by an electric motor or any other power, until such time as sufficient power can be produced from the generator to run the turbine. After the turbine is once running from the power produced by the generator alone, a certain portion of the produced power will be utilized to run the heat generator.

The speed of the turbine is controlled by a governor 56 which is attached to shaft 15 and has a link connection with cylindrical valve 54. It will be noticed that the valve seat 53 contracts toward the turbine chamber as it passes from the mixing chamber to the turbine chamber, thereby forming, as it were, a big nozzle for the motive fluid. The fluid accordingly will have less velocity and greater mass when the valve is widely open, and less mass and greater velocity when the valve is nearly closed. Valve 54 does not rotate with shaft 15 but is held from rotation by means of pin 85 on the inner side of the shell of receiver B, a slot being provided in the valve for pin 85. The link connection of the governor is attached to a band 86 which is rotatably mounted in a suitable groove in valve 54. It is apparent that should the speed of the turbine decrease, the governor 56 will cause the cylindrical valve 54 to move along the shaft 15 causing the area of the opening 53 to increase and a less part of the pressure of the mixture of the hot gases, steam and air through opening 53 will be transformed into kinetic energy. It will bear upon the blades 83 of the turbine with greater mass and less velocity which will bring the turbine up to its normal speed, after which the governor 56 will by its centrifugal force move valve 54 along drum 55, thereby making the area of the opening 53 less and causing the pressure in the receiver B to be raised and the mixture of gases, steam and air, which pass through the opening 53 will have more velocity and less pressure. The governor 56 thus controls or equalizes the movement of the turbine by a continuous flow of the motive fluid, always transferring a continuous though varying part of the pressure of the motive fluid or potential energy into kinetic energy according to the outflow through the variable orifice of the nozzle 53.

The arrangement of the mixer and turbine around the shaft 15 permits of a concentric grouping of these parts which makes them more compact and simplifies the control of the motive fluid in the mixer so that the fluid is equalized in its pressure upon and passage through the nozzle of the valve seat 53 and consequently gives an equal pressure upon all of the vanes surrounding the turbine 55.

I will now describe the operation of the engine. In starting the engine, the heat generator A is uncoupled from the turbine C by means of a suitable clamp 95 on the main driving shaft 15. The generator A will be started into motion by an electric motor or any other suitable power which is coupled on to the drive shaft 15 by a suitable clutch 96. The opening 53 is closed by valve 54 by a lever, not shown, and the product of combustion, heated air, and steam of the motive fluid are stored up in receiver B until a sufficient pressure is obtained to start the turbine C. The valve 54 is then opened and the mixture of the gaseous products of combustion, heated air and steam starts the turbine into rotation and will be governed by the governor 56. The clamp 95 is then closed and the clamp 96 is uncoupled, thereby transferring the generator to the turbine, and thereafter a certain portion of the turbine's power will be utilized to run the heat generator.

The gas fuel is admitted through pipe 24 valves 26 and 21 to the mixing chamber 19, and the air is simultaneously admitted through pipe 23 and valves 27 and 20 to said mixing chamber. Hence, when the piston 12 makes the outward stroke a constant mixture of air and gas will be sucked into the cylinder through valve 18. By the inward stroke of piston 12 the mixture will be pressed together until it is self-ignited by the temperature caused by compression. The pressure in the explosion chamber after the explosion will be greater than the pressure in chamber 32, consequently the valve piston 16 will be raised and a portion of the product of combustion and heat will pass through port 17 into the mixer B.

As the pressure diminishes in the explosion chamber by the passage of part of the product of combustion and heat through port 17, the piston 16 will have a tendency to drop down and close port 17. To avoid this, piston 12 continues its inward stroke thereby always keeping the pressure on piston 16 greater than the pressure in chamber 32 and thus allowing and compelling the passage of the gaseous product of combustion and heat through port 17 into the mixer B until all the gases and heat are driven out of the explosion chamber and piston 12 reaches its highest point or the dead center of arm 14, after which it will begin its outward stroke. Piston 16 on account of the pressure in chamber 32 will follow piston 12 downward in close connection closing port 17 and passing down until the pressure in chamber 36 equals the pressure in chamber 32. In this manner the capacity of the explosion chamber is controlled and none of the products of combustion or heat are allowed to flow back from the mixer into the compression cylinder.

After piston 16 reaches its balanced position closing port 17, piston 12 continues its outward stroke thereby causing a vacuum and the suction opens valve 18 admitting a new charge of air and gas into the cylinder and the whole process is repeated.

As above described, the moment the explosion occurs, the explosion pressure presses back piece 38 and water or air under pressure greater than the pressure in the explosion chamber, as a cooling medium will be injected into the explosion cylinder, coming into direct communication with the heat and product of combustion. The movement of the piece 38 and also the time of the injection of the water is regulated by the explosion pressure, so that the amount of water depends upon the height of the explosion pressure; that is, the higher the explosion pressure, the more the piece 38 will be pressed back and accordingly more water or air will be furnished. However, the volume of steam from the water is small compared with the volume of heat produced.

Let it be noted that a special compression chamber is not needed in this invention like those used at the present time in all combustion and explosive engines. Instead the explosion occurs in a part of the cylinder through which the working piston passes. According to the amount of gas and air sucked into the cylinder, the explosion will occur at any time of the compression stroke when the temperature of the fuel has reached its ignition point. The gases, heat, air, and steam are mixed in the receiver or mixer B by being driven back and forth around the partitions 47 and thence pass out through valve opening 53 into the turbine, where they, by the peculiar curve of blades 82 and 83, turn the turbine cylinder 79. At the same time a portion of the mixture balances the weight of the turbine cylinder 79 by passing into chamber 80. After passing through the series of blades 82 and 83, the mixture passes out through the channel 76 around cylinder 75 and out of exhaust port 76.

It is apparent that by introducing both air and water into the explosion or combustion chamber and also into the mixer B, as desired, immediately after each recurring explosion, the temperature of the heat units is so controlled that nearly all the thermal units are utilized for the expansion of fluids; and that these are so combined as to get the least loss from the latent heat and condensation of the fluids. A condensation plant is not needed. It is also obvious that there is no change in the physical state of the air injected, so that the heat given to it is available for immediate conversion into work.

I claim as new:—

1. The combination in a gas engine, of a heat generator, a shaft to operate said heat generator, a rotary engine on said shaft to turn the same, said heat generator and rotary engine having a mixing chamber therebetween around said shaft, direct valvular connection between said generator and mixing chamber, and direct valvular connection between said mixing chamber and rotary engine around said shaft.

2. In an apparatus of the character described, the combination of an explosion cylinder for gases to obtain the hot products of combustion, a shaft to operate said explosion cylinder, a rotary engine on said shaft, said explosion cylinder and rotary engine having a mixing chamber therebetween for said hot products of combustion, direct valvular connection between said explosion cylinder and said mixing chamber, and direct valvular connection between said cylinder and mixing chamber and rotary engine for the hot products of combustion.

3. The combination in a gas engine, of a heat generator and rotary engine on the same shaft, a mixing chamber for the heated products of combustion around said shaft and between said heat generator and rotary engine, valvular connection between said heat generator and mixing chamber, a valve around said shaft connecting said mixing chamber and rotary engine, and an automatic control on said shaft for said valve.

4. The combination in a gas engine, of a rotary engine mounted on a shaft to drive the same, the casing of said rotary engine extended out in a mixing chamber for the heated products of combustion, said casing having a nozzle-shaped opening around said shaft connecting said mixing chamber and rotary engine and a valve to fit said nozzle, a generator for the heated products of combustion on said shaft to be actuated thereby and having connection with said mixing chamber, said shaft extending through said mixing chamber to actuate said heat generator.

5. The combination in a gas engine of a rotary engine mounted on a shaft to turn the same, the casing of said rotary engine extended out in a cylindrical mixing chamber for the heated products of combustion, a controllable nozzle connecting said mixing chamber and rotary engine, a generator for the heated products of combustion connected to said mixing chamber, said shaft extending through said mixing chamber to actuate said heat generator.

6. The combination in an internal combustion engine, of a heat generator having a mixing chamber for the heated products of combustion connected thereto, means for automatically injecting a controlling medium for said heated products of combustion into said generator and mixer, and a rotary engine having direct valvular connection with said mixing chamber to be actuated by said controlled products of combustion.

7. The combination in a gas engine of a rotary engine mounted on a shaft to drive the same, a generator for the heated products of combustion actuated by said shaft, a mixer or receiver for said heated products of combustion having a valvular ingress from said generator and a valve controlled egress giving simultaneous admission to the vanes of the entire circumference of said rotary engine, said mixing chamber and egress arranged concentrically around said shaft between said generator and rotary engine.

8. The combination in an internal combustion engine, of a combustion chamber for the quick generation of heat, a mixer or receiver for said heat having connection to said combustion chamber, valvular control of said connection actuated by said quick generation, a turbine having direct valvular connection to said mixer to be actuated by said heated mixture therefrom, and a governor for said turbine valvular connection automatically controlled by said turbine, substantially as and for the purpose specified.

9. The combination in an internal combustion engine, of a combustion chamber for the quick generation of heat, a mixer or receiver for said heat having connection to said combustion chamber, valvular control of said connection actuated by said quick generation of heat, means actuated by said quick generation of heat for injecting a fluid cooling medium in said combustion chamber and said mixer, and a turbine having valvular connection with said mixer to be actuated by the heated mixture therefrom.

10. The combination in an internal combustion engine, of an explosion chamber for the quick generation of the product of heat, a mixer or receiver for said heat products having valvular connection to said explosion chamber, said valvular connection actuated by the explosion in said explosion chamber, means actuated by said explosion for injecting a fluid cooling medium into said explosion chamber and said mixer, and a turbine having valvular connection with said mixer to be actuated by the heated mixture therefrom.

11. In a gas turbine, a combustion chamber for the quick generation of the hot products of combustion, means actuated by said quick generation of said hot products of combustion for mixing air and water therewith, a mixer or receiver for the heated mixture having automatic valvular connection with said combustion chamber, and a turbine having valvular connection with said mixer or receiver to be rotatably actuated by said heated mixture.

12. In a gas turbine a combustion chamber for the quick generation of heat, means actuated by said quick generation of heat for mixing air and water with said heat, a mixer or receiver having automatic valvular connection with said combustion chamber, and a turbine having valvular connection with said mixture to be rotatably actuated by said heated mixture.

13. In a gas turbine, a combustion chamber for the quick generation of heat, means actuated by said quick generation of heat for mixing air and water with said heat, a mixer or receiver having valvular connection with said combustion chamber, and a turbine having valvular connection with said mixer to be rotatably actuated by said heated mixture, steps in said turbine, said mixture so proportioned as to reduce the number of said steps to a minimum, substantially as and for the purpose specified.

14. In a gas turbine, a combustion chamber for the quick generation of heat, means for supplying fuel to said combustion chamber, a mixer or receiver for said heat having a series of chambers, said mixer having valvular connection with said combustion chamber, means in said mixer or receiver for controlling said fuel supply by the pressure in the last of said series of chambers, and a turbine having valvular connection with said last chamber to be rotatably actuated by the heated mixture therefrom.

15. The combination in a gas engine of a rotary engine mounted on a shaft to turn the same, the casing of said rotary engine extended out in a cylindrical mixing chamber, a conical shaped fluid outlet directly connecting said mixing chamber and rotary engine, a governable cone on said shaft in said conical fluid outlet to control the same, said fluid outlet forming a valvular opening for discharging the motive fluid directly against the entire circumference of said rotary engine, a generator for the heated products of combustion having valvular connection to said mixing chamber, said shaft extending through said mixing chamber to actuate said heat generator.

16. The combination in a gas turbine of a mixer or receiver B having a series of chambers for gaseous fluids under pressure, a heat generator A having a variable combustion chamber for the quick generation of heat, a valve 16 and connection 17 between said series of chambers and said combustion chamber, said valve actuated by said quick heat generation, automatically actuated valves 48 between said series of chambers, an elastic fluid turbine C having direct connection to the last of said series of chambers, and a valve 54 in said connection turbine having a controlling governor 56, substantially as and for the purpose specified.

17. The combination in a gas turbine, of a heat generator A, means for supplying gaseous fuel to said generator, a mixer or receiver B having automatic connection to said generator to receive the heated products of combustion, an elastic fluid turbine C having automatic connection to said mixer or receiver B to be driven by the heated gaseous fluid therefrom, and a piston 12 in said heat generator having actuating connection with said turbine to explode said gaseous fuel by compression of the same.

In testimony whereof I have signed my name to this specification in the presence of two subscribing witnesses.

JOHN ILLY.

Witnesses:
A. W. KETTLE.
I. A. ELSWORTH.